United States Patent [19]

Kashimura et al.

[11] 4,425,891
[45] Jan. 17, 1984

[54] ENGINE KNOCK CONTROL APPARATUS

[75] Inventors: Yuichi Kashimura, Katsuta; Seiji Suda, Mito; Noboru Sugiura, Katsuta, all of Japan

[73] Assignee: Hitachi, Ltd., Tokyo, Japan

[21] Appl. No.: 290,651

[22] Filed: Aug. 6, 1981

[30] Foreign Application Priority Data

Aug. 14, 1980 [JP] Japan .............................. 55-110999

[51] Int. Cl.³ .............................................. F02P 5/04
[52] U.S. Cl. ........................................ 123/425; 73/35
[58] Field of Search ............... 123/425, 424, 426, 428, 123/415; 73/35

[56] References Cited

U.S. PATENT DOCUMENTS

| | | | |
|---|---|---|---|
| 4,012,942 | 3/1977 | Harned | 123/425 |
| 4,153,020 | 5/1979 | King et al. | 73/35 |
| 4,312,214 | 1/1982 | Kramer et al. | 73/35 |
| 4,329,970 | 5/1982 | Mowery | 123/425 |
| 4,333,334 | 6/1982 | Nakajima et al. | 73/35 |
| 4,343,278 | 8/1982 | Asano | 123/425 |
| 4,354,378 | 10/1982 | Oshiage et al. | 123/425 |

FOREIGN PATENT DOCUMENTS 54-155322 12/1979 Japan .................................. 123/425
55-69026 5/1980 Japan .................................. 123/425

Primary Examiner—P. S. Lall
Attorney, Agent, or Firm—Antonelli, Terry & Wands

[57] ABSTRACT

The output of a knock sensor for detecting a knock signal of an engine is applied to a bandpass filter for bandpassing only the knock signal. The output of the bandpass filter is applied to an automatic gain control circuit for variably controlling the gain of the knock signal. The output of the automatic gain control circuit is applied to an averaging circuit via a maximum clamp circuit. A comparator supplies an output to an integration circuit of the next stage when the output of the bandpass filter becomes greater than that of the averaging circuit. An ignition control device for controlling the spark timing of an ignition coil energizes the ignition coil by the output from a pick-up coil and that of the integration circuit and delivers a feedback signal to the integration circuit.

10 Claims, 17 Drawing Figures

FIG. 4
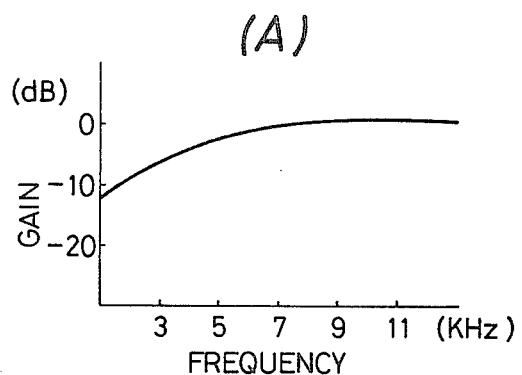
(A)
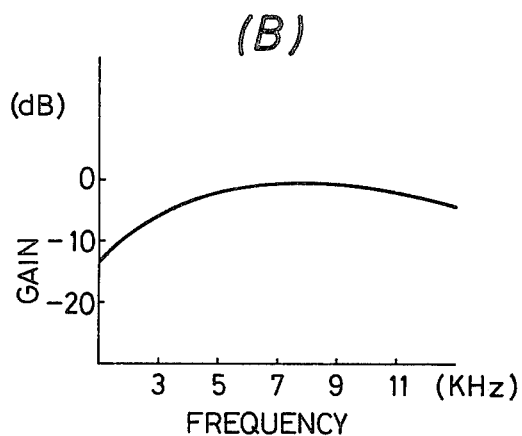
(B)
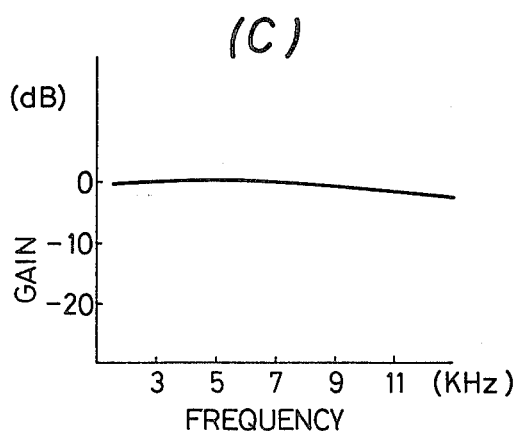
(C)

(1) OUTPUT SIGNAL OF COMPARATOR 118

(2) OUTPUT VOLTAGE OF CONDENSOR 166

(3) OUTPUT SIGNAL OF COMPARATOR 169

(4) OUTPUT SIGNAL OF INTEGRATING CIRCUIT 125

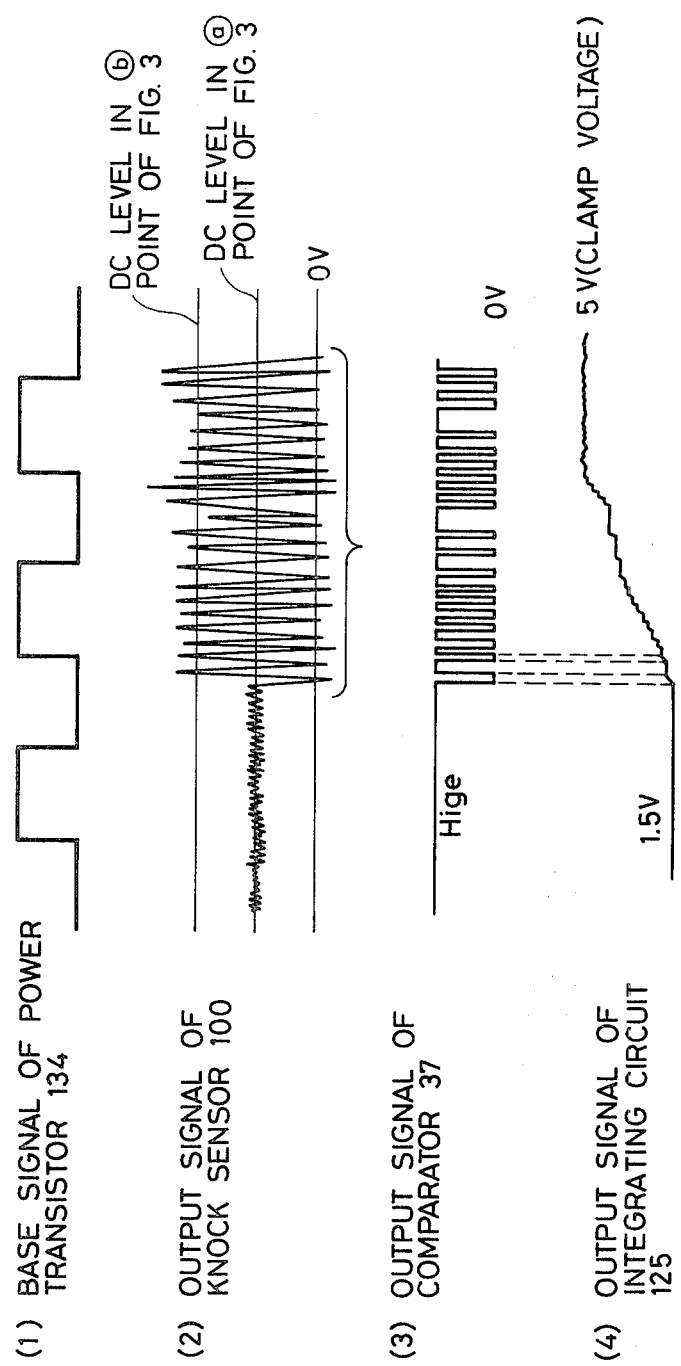

ENGINE KNOCK CONTROL APPARATUS

BACKGROUND OF THE INVENTION

This invention relates to an engine knock control apparatus.

The engine knock control apparatus detects knocking of an internal combustion engine as a knock signal by means of a knock sensor and controls a spark timing by the detected knock signal.

The engine knock control apparatus of this kind is disclosed in FIG. 2 of U.S. Pat. No. 4,111,035 entitled "Engine knock signal generating apparatus with noise channel inhibiting feedback", for example.

In the engine knock control apparatus disclosed in this U.S. Pat. No. 4,111,035, the output from a knock sensor is applied to one of input terminals of a comparator through a bandpass filter to remove noise components while the output of the bandpass filter is first averaged by noise reference and is then applied to the other input terminal of the comparator so as to effect knock control by the output of the comparator.

However, the detection signal detected by the knock sensor generally involves amplitude fluctuation of as large as from $\pm 5$ (mV) to $\pm 600$ (mV) irrespective of the kind of the knock sensor. In order to correctly pick up and discriminate the knock signal, therefore, the signal must be leveled up to a discriminating level by use of an amplifier. If the detection signal is merely amplified by amplifiers in general, however, the detection signal can not be amplified up to a level that exceeds a battery voltage to be employed as a power source of the amplifier, because its maximum voltage is determined by the battery capacity.

If the gain of the amplifier is kept at a high level, the amplifier output would saturate when the knock signal is excessive, whereby an excessively large knock control signal is generated from the comparator and proper knock control becomes impossible. If the gain of the amplifier is kept at a low level, on the contrary, an excessively small knock control signal would be generated from the comparator when the knock signal is small, whereby proper knock control becomes impossible. For these reasons, the conventional engine knock control apparatus are not devoid of low reliability.

SUMMARY OF THE INVENTION

It is therefore an object of the present invention to provide an engine knock control apparatus having high reliability.

To accomplish the abovementioned object, the present invention provides an engine knock control apparatus which is equipped, as a pre-stage circuit to a comparator, with an automatic gain control system for making constant the gain of the amplifier in proportion to the amplitude ratio of the knock signal to the amplitude of the background level, or in the input signal ratio, the background level being obtained by averaging the knock signals at the time of amplifying the knock sensor output.

It has been confirmed according to the experimental results obtained by the inventors of the present invention that the input signal ratio is substantially irrelevant to the magnitude of the amplitude of the knock signals and remains constant. On the basis of these experimental results, the present invention provides an engine knock control apparatus having high reliability by controlling the gain of the amplifier to the constant level in proportion to the input signal ratio, thereby making it possible to obtain a proper knock control signal from the comparator irrespective of the magnitude of the knock signal.

To accomplish the abovementioned object, further, the present invention provides an engine knock control apparatus which includes a maximum clamp circuit in a background level circuit.

Disposition of the maximum clamp circuit in the background level circuit prevents abnormal rise of the voltage of the background level circuit and stabilizes the knocking detection performance. As a result, an engine knock control apparatus having high reliability can be obtained.

BRIEF DESCRIPTION OF THE DRAWINGS

FIGS. 4A–C is a characteristic diagram of a resonance circuit consisting of the knock sensor and the condensor coupling shown in FIG. 3;

FIG. 15 is a time chart when an abnormal voltage superposes at point (a) in FIG. 3.

DESCRIPTION OF THE PREFERRED EMBODIMENT

Figure 1:
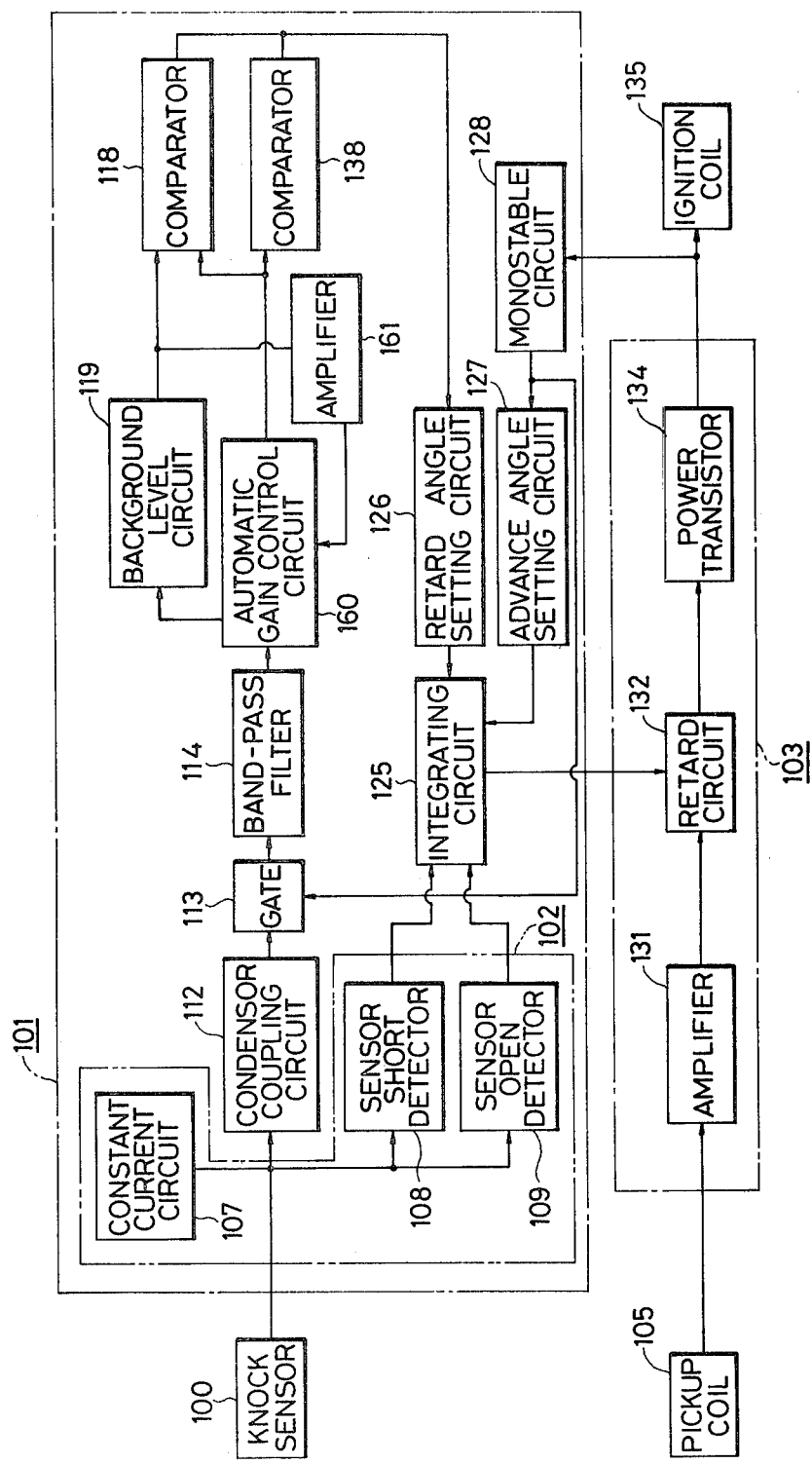
FIG. 1 is a block diagram showing the overall construction of the apparatus in accordance with the present invention.

Referring to an engine knock control apparatus of the present invention shown in FIG. 1, the engine knock control apparatus of the invention comprises a knock sensor 100 for detecting a knock signal, a knock control apparatus 101 for generating a control signal for controlling the spark timing of an ignition coil 135 by means of the knock signal applied thereto from the knock sensor 100, a pick-up coil 105 for detecting the spark timing of the ignition coil 135, and a non-contact ignition device 103 for energizing the ignition coil 135 by means of the output from the pick-up coil 105 and that of the knock control apparatus 101 and for delivering a feedback signal to the knock control apparatus 101.

The knock control apparatus 101 receives the detection signal of the knock sensor 100 and the output signal of the non-contact ignition device 103 and controls the non-contact ignition device 103 in accordance with the magnitude of knocking, thereby allowing the ignition device to perform retard angle control.

The knock control apparatus 101 comprises a fail-safe device 102 for detecting the fault of the knock sensor 100 and delivering a signal for compulsively retarding the angle of the spark timing, a condensor coupling circuit 112 for removing d.c. components, an ignition noise cut circuit having a gate for cutting the spark noise in synchronism with the spark timing, a bandpass filter (BPF) 114 for band-passing the knock signal, an automatic gain control (AGC) circuit 160 for controlling the gain of an amplifier of its own in proportion to the input signal ratio by means of the output of the BPF 114, a background level (BGL) circuit 119 for obtaining a mean value of the knock signal by means of the input from the AGC circuit 160, an amplifier 116 for amplifying the output of the BGL circuit 119 and feeding it back to the AGC circuit, a first comparator 118 for comparing the BGL output signal with the output signal of the AGC circuit 160 and generating a retard angle signal in proportion to the knocking signal, a second comparator 138 using a pre-set voltage as a reference signal, a retard angle setting circuit 126 for logically operating the AND between the output of both comparators 118, 138 and setting the retard angle signal in proportion to knocking, a monostable multivibrator 128 for generating a signal of a predetermined pulse width in synchronism with the cut of the ignition coil 135 by means of the signal from the non-contact ignition device 103, an advance angle setting circuit 127 for generating a signal for advancing the angle of the spark timing of the ignition coil 135 at a predetermined voltage/period ratio during the period in which the output pulse of the monostable multivibrator 128 is being generated, and an integration circuit 125 for generating a d.c. voltage proportional to the retard angle signal set in the retard angle setting circuit 126 and to the advance angle signal set in the advance angle setting circuit 127, and compulsively retarding the angle of the spark timing of the ignition coil 135 by means of the output from the fail-safe device 102.

The fail-safe device 102 has a fail-safe function to detect various fault or abnormal modes of the knock sensor 100 and allows it to perform the retard angle control in accordance with the detected mode. The fail-safe device 102 consists of a constant current circuit 107, a sensor short detector 108 and a sensor open detector 109 and provides the output of each circuit to the integration circuit 125, thereby performing the fail-safe function.

The BGL output circuit 119 generates an averaged signal.

The non-contact ignition device 103 consists of an amplifier 131 for wave-shaping the output signal of the pick-up coil 105, a retard circuit 132 for controlling the spark timing in accordance with the output voltage of the knock control apparatus 101 and a power transistor 134 for generating a high voltage on the secondary side of the ignition coil 135.

Next, the operation of the abovementioned construction will be described on the basis of the waveforms shown in FIG. 2.

Figure 2:
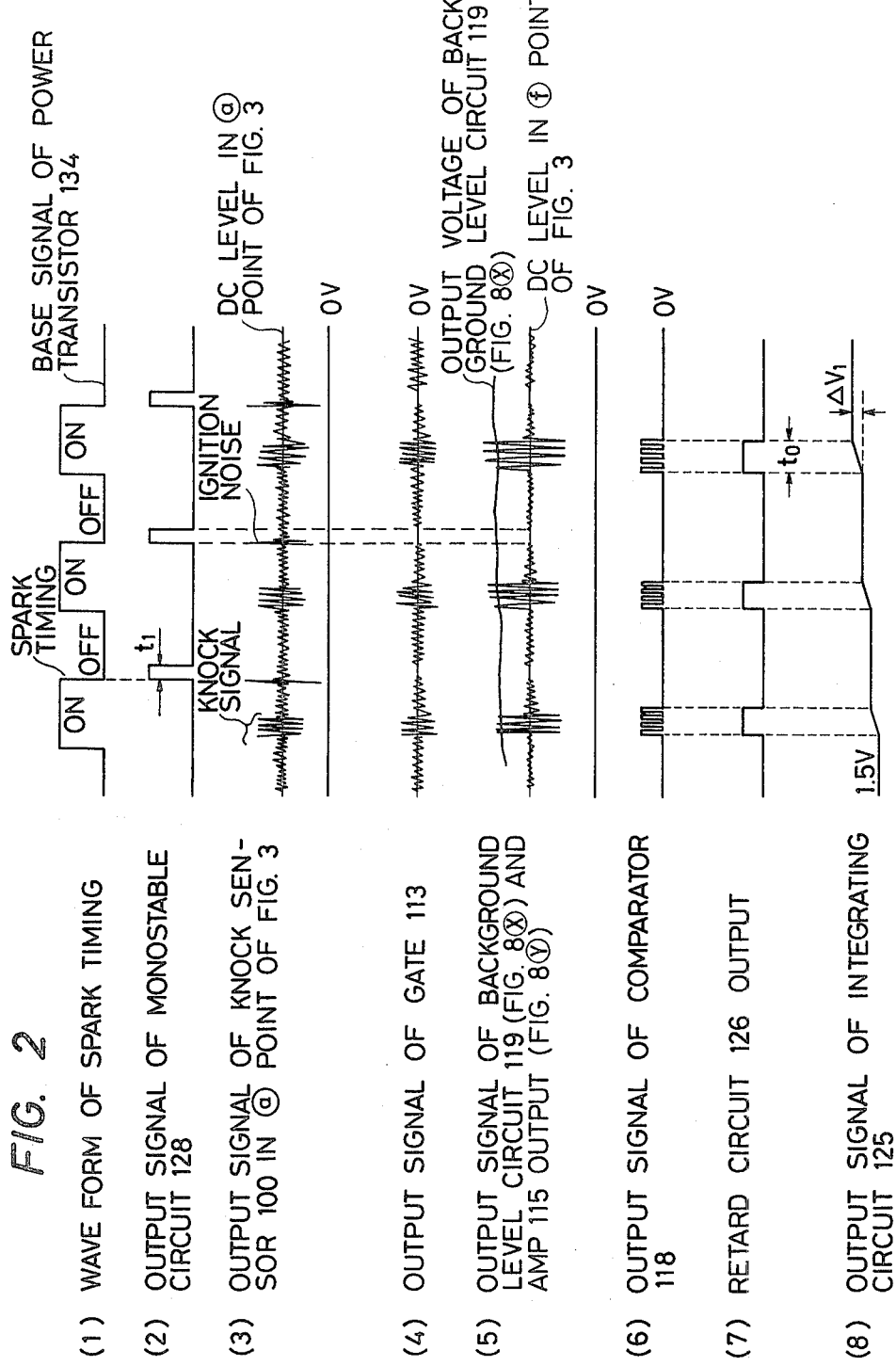
FIG. 2 contains waveform charts each showing the waveform of each portion of the apparatus in a time chart.

FIG. 2(1) shows the spark timing waveform. In practice, this waveform signal becomes a base signal to the power transistor 134 of the non-contact ignition device 103. The power transistor 134 is turned ON at an H level and is turned off at a L level. The spark on the ignition coil 135 occurs in the transient period in which the transistor 134 is switched from ON to OFF. FIG. 2(2) shows the output signal of a predetermined pulse width of the monostable circuit 128 which receives the base signal as the input and is triggered when the transistor changes from ON to OFF thereby to generate the pulse signal of a predetermined width ($t_1$). FIG. 2(3) shows the leveled-up output of the knock sensor 100. The signals detected by the knock sensor 100 are those which change to positive and negative with a d.c. zero level as the reference. The knock signal is included in these detection signals. On the other hand, the detectors 108 and 109 are disposed in order to realize a fail-safe operation. In the fault mode in these detectors, mode detection is not possible if the signal is one of the abovementioned d.c. zero level. To cope with this problem the constant current circuit 107 is employed. When a constant current from the constant current circuit 107 overlaps the output of the sensor 100, biasing is effected in a predetermined positive direction. This constant current circuit 107 plays a significant role. Namely, if the constant current circuit 107 does not exist, the output of the knock sensor 100 changes within the range of from ±5 mV to ±600 mV. This change width becomes 120 times maximum.

If the knock d.c. impedance is 840 Ohms and $L=1$H, the a.c. impedance at 7 KHz is about 44 K.Ohms. If the knock sensor output is to be leveled up by ordinary bias means using resistor voltage division for the purpose of d.c. level up such as by about 1.6 V in the abovementioned case, biasing from the 6 V power source using a resistor of about 2.3 K.Ohms is necessary. In this case, the damping ratio of the a.c. signal at the 7 KHz output of the knock sensor by the bias means consisting of the 2.3 KΩ resistor is about 1/20, and the output after biasing when the knock sensor output is ±5 mV drops to 0.25 mV. Obviously, this invites lowering of the detection accuracy, and detection of the fault mode becomes impossible in the worst case. The present invention improves the knock detection accuracy and facilitates the fault mode detection by providing the constant current circuit 107.

FIG. 2(3) shows the sensor output which is biased by the constant current circuit 107.

The condensor coupling circuit 112 is disposed in order to remove d.c. components. Further, the circuit is possessed of the function of causing resonance in the knocking frequency range. Since the d.c. bias is removed by the condensor coupling circuit 112, remarkable contribution is obtained to the improvement in the noise cut performance in the next ignition noise cut circuit 113. The ignition noise could not be cut unless the d.c. bias is first removed.

The ignition noise cut circuit 113 is controlled by the pulse output of the monostable circuit 128 such as shown in FIG. 2(2). The noise cut circuit 113 is a kind of AND gate and converts the output pulse of the monostable circuit 123 into a gate signal. Accordingly, only during the period $t_1$ in which the output pulse of the monostable circuit 128 is "1", the sensor output obtained via the condensor coupling circuit 112 is clamped at about OV. Thus, ignition noise cut is effected.

Figure 8:
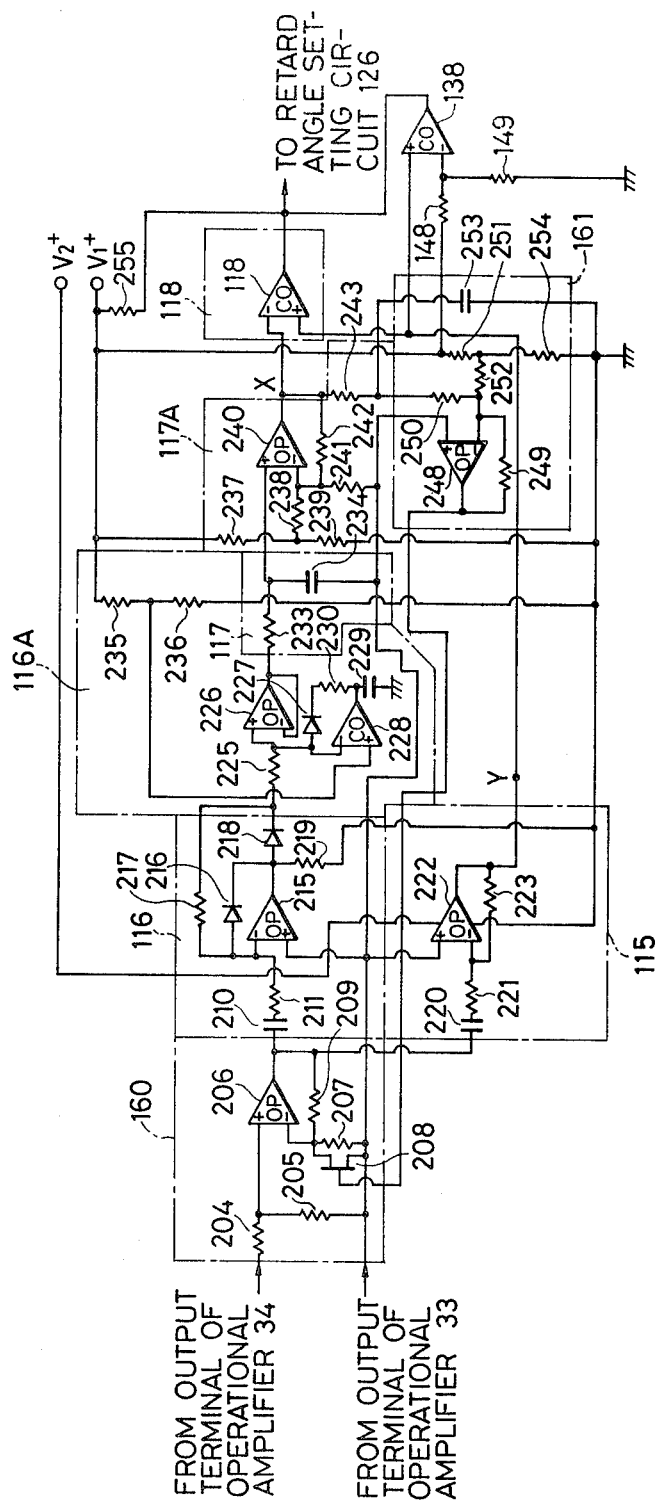
FIG. 8 is a detailed circuit diagram of the block diagram shown in FIG. 6.

The BPF 114 generates the knock signal by stressing it (or by damping the other signals), and has such a characteristic that considerable damping occurs at a frequency higher than the knock signal of knocking. In the present invetion, the BPF 114 may be changed to an amplification circuit. The amplifier 115 receives the output of the BPF 114 and performs amplification of predetermined gain. Upon receiving the output of this amplifier 115, the BGL output circuit 119 detects the BGL. The comparator 118 compares the BGL output (FIG. 8 X (voltage)) with the output (FIG. 8 Y). The conditions of both signals at this time are shown in FIG. 2(5). The comparator 118 shapes only the output of the amplifier 115 greater than the BGL output. The AND output between the comparator 118 and a comparator 138, which is disposed in order to prevent the comparator 118 from detecting small signals other than the knock signal as if they were the knock signal, as will be later described, is applied to the retard angle signal output circuit 126 and is converted into a d.c. level signal, which is the knock signal to be determined.

FIG. 2(6) shows the knock signal detected by the comparator 118 and FIG. 2(7) shows the output of retard angle setting circuit 126. If the operation of the comparator 138 is hereby neglected, the integration circuit 125 receives the output signal of the retard angle setting circuit 126 and integrates the pulse only when the pulse is at the H level ("1" FIG. 2(7)). Accordingly, an integration value corresponding to the number of pulses is produced from the integration circuit 125. FIG. 2(8) shows the output of the integration circuit 125. Retard angle control is effected in the retard circuit 132 by means of this integration output.

Figure 3:
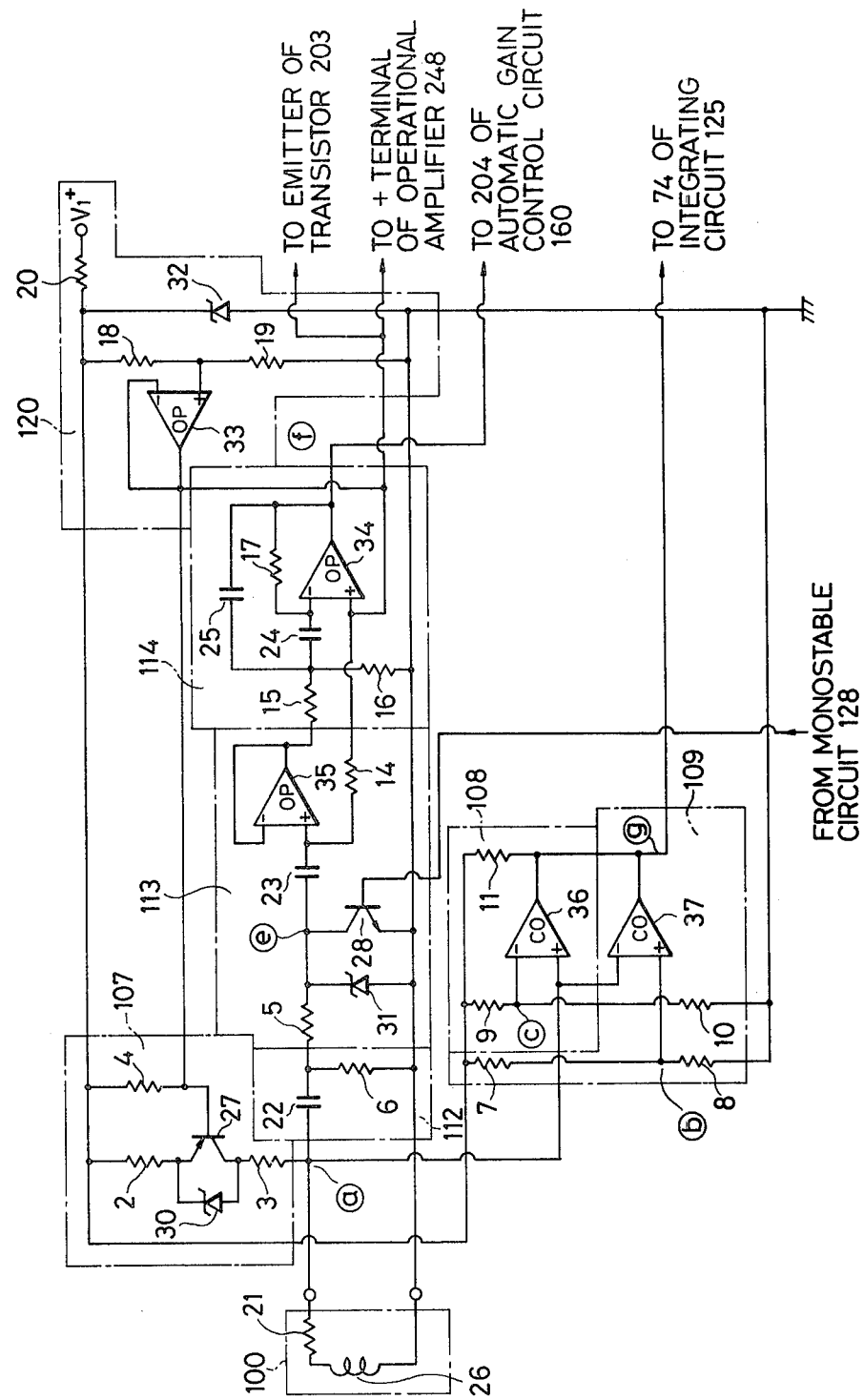
FIG. 3 is a circuit diagram showing in detail a circuit which includes a knock sensor, a fail-safe device, a condensor coupling circuit, a gate and a bandpass filter that are shown in FIG. 1.

FIG. 3 shows a definite construction of the circuit ranging from the knock sensor 100 to the BPF 114 of the overall construction shown in FIG. 1. The knock sensor 100 is an induction type sensor using a magnetrostriction element and equivantly, is a series of circuit consisting of an inductance 26 and a resistor 21. Generally, the value of the inductance 26 is 1H and that of the resistor 21, approximately 840 Ohms.

The constant current circuit 107 consists of resistors 2, 3, 4, a zener diode 30 and a transistor 27. The power to this circuit 107 is supplied from a power source 120. The power source 120 consists of resistors 20, 18, 19, a zener diode 32, and an operational amplifier 33. The operational amplifier 33 plays the roll of a buffer. The zener voltage of the zener diode 32 is set at 6 (V) and the output of the operational amplifier 33, is set at 3 (V). The collector current of the PNP transistor 27 is set to approximately 1.9 mA. Accordingly, a d.c. bias voltage at the point (a) becomes about 1.6 (V) and the output signal of the knock sensor 100 overlaps this 1.6 V voltage.

The constant current circuit 107 is employed for the following reason.

The output impedance Z of the knock sensor 100 is determined by the values of the resistor 21 and inductance 26. Accordingly, the value of the impedance Z at a knocking frequency (approx. 7 KHz) is given as follows:

$$Z = 2\pi fL + R_{21} \qquad (1)$$
$$= 2\pi \times 7,000 \times 1 + 840$$
$$= 45 \text{ (K. Ohms)}$$

If the input impedance of the knock sensor connecting portion of the knock control apparatus is low, the knock sensor output signal attenutates drastically. The knock sensor output varies within the range of 120 times from ±5 (mV) to ±600 (mV).

The constant current circuit 107 is disposed to enhance the input impedance. Especially in the construction shown, the d.c. bias circuit is formed in the constant current arrangement and hence, the impedance of this d.c. bias circuit becomes a value of approximately infinity.

On the other hand, disturbance noise is likely to overlap if the input impedance of the knock control apparatus is increased. A typical example of the disturbance noise is an ignition noise (Ig noise) occurring in synchronism with the spark timing.

Here, the ignition noise will be discussed.

Base control of the power transistor is effected by use of the pulse such as shown in FIG. 2(1). When this pulse is at the H level, the power transistor is turned ON and is turned OFF when the pulse is at the L level. During the transient period in which the transistor changes from ON to OFF or at the point when the transistor is turned OFF, the secondary voltage of the ignition coil drastically elevates and generates primary noise. Due to further elevation of this secondary voltage, insulation by the air layer between the plugs is destroyed and ignition takes place. The secondary noise occurs at this time of ignition. The secondary noise can be divided into a noise due to capacitance discharge current flowing at the initial stage of ignition and a noise due to an induction discharge current flowing at the later stage. The former becomes a major noise source among the secondary noise. When the input impedance is increased, the primary noise and the secondary noise (the former noise) overlap the aforementioned knock sensor output as the disturbance noises that exert adverse influences on the knock signal discrimination. Hence, the disturbance noises must be removed. The disturbance noises continue over the period of about 50 to 60 μsec. Hence, the knock sensor output may be masked during this period. To accomplish this object, the condensor coupling circuit 112 and the noise cut circuit 113 are disposed. However, the practical mask zone is set to a time width sufficiently greater than the abovementioned noise continuation period such as about 0.8 msec., for example.

The condensor coupling circuit 112 consists of a capacitor 22 and a resistor 6. The noise cut circuit 113 consists of resistors 5, 14, a zener diode 31, a capacitor 23, a transistor 28 and an operational amplifier 35. The condensor coupling circuit 112 is disposed as means for taking out the knocking signal from the knock sensor output signal in a satisfactory manner. As the knocking signal is passed through this circuit 112, the d.c. bias voltage overlapping the knock sensor output signal is removed. When only the knock signal is to be taken out from the knock sensor output overlapping the d.c. bias component and when the abovementioned noise mask is to be applied, the treatment becomes extremely complicated. The concept of d.c. cutting itself is simple and is an extremely practical technique in order to correctly discriminate the knock signal.

The noise cut circuit 113 performs Ig noise cut primarily by means of the operation of the transistor 28. The transistor 28 is turned on and off by the output of the monostable multivibrator 128. As shown in FIG. 2(1), the monostable multivibrator 128 is triggered by the fall of the base signal of the power transistor, thereby generating a pulse of a mask zone width. FIG. 2(2) shows the output of this monostable multivibrator 128 whose mask zone width is the time width $t_1$. The transistor 28 is turned on only in the time zone $t_1$ in which the output of this monostable multivibrator 128 becomes "1". During this time zone $t_1$, therefore, the knock sensor output is short-circuited, is not the input to the operation amplifier 35 and exhibits the mask effect of masking the Ig noise. It would be conceived to employ resistors 5, 6, 14 and capacitors 22, 23 as the load impedance of the sensor 100, but the resistors 5, 14 and the capacitor 23 can be negligible if the resistor 14 has high resistance such as 1 Megohms, for example. Accordingly, it is possible to regard that the load of the sensor 100 is only the capacitor 22 and the resistor 6.

For the abovementioned reasons, the condensor coupling circuit 112 also has the function of resonance circuit means for stressing and taking up the knock signal among the knock sensor output therefrom in addition to its role of removing the d.c. component. This will be described in further detail.

As described above, the resistors 5, 14 and the capacitor 23 can be neglected as the load when the knock control apparatus is viewed from the side of the knock sensor 100 by selecting high resistance for the resistor 14. Hence, the load is only the condensor coupling circuit 112. In other words, the resonance circuit is formed solely by the knock sensor 100 and the condensor coupling circuit 112. Namely, a circuit consisting of the inductance 26, the resistor 21, the capacitor 22 and the resistor 6 is the resonance circuit. The resonance circuit is capable of exhibiting the function of a by-pass filter which damps (approx. 5 dB) 3–5 KHz engine oscillation with respect to the knock signal (approx. 7 KHz). The gain at this time is given by the following equation:

$$G = 20 \log \frac{\omega R_6 C_{22} e^{j(\frac{\pi}{2} - \theta_1)}}{\sqrt{(1 - \omega^2 L_{20} C_{22})^2 + \{\omega(R_{21}C_{22} + R_6 C_{22})\}^2}} \quad (2)$$

$$\tan\theta = \frac{\omega C_{22}(R_{21} + R_6)}{1 - \omega^2 L_{26} C_{22}} \quad (3)$$

FIG. 4 shows the characteristics of the resonance circuit thus obtained. FIG. 4(A) shows the by-pass filter characteristic when the capacitance of the capacitor $C_{22}$ is as large as 100 PF. FIG. 4(B) shows the characteristic when the capacitance of the capacitor $C_{22}$ is increased to 470 PF. It also shows the band-pass filter characteristic. The resonance circuit to be practically formed has a band-pass filter characteristic approximate to that shown in FIG. 4(B). Incidentally, when the value of the capacitor $C_{22}$ is 470 PF and that of the resistor 6 is 20 K.Ohms, the resonance frequency is 7 KHz and the circuit exhibits the band-pass filter characteristic.

Figure 5:
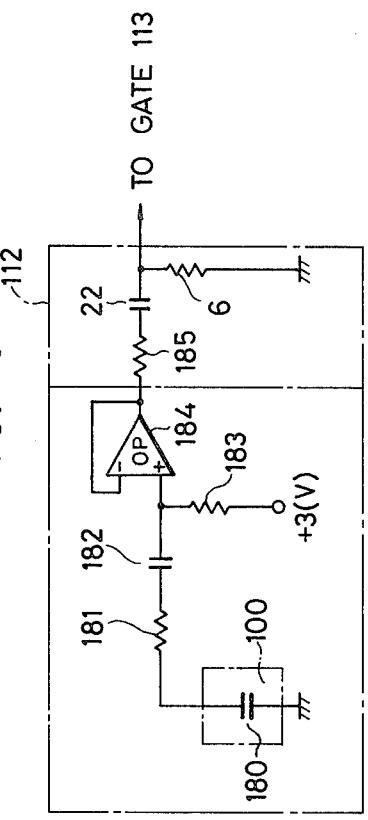
FIG. 5 is a circuit diagram showing another circuit construction of the knock sensor.

FIG. 5 shows a circuit diagram in which a piezoelectric sensor 100 is disposed in place of the knock sensor using the magnetostriction element. Equivalently, this piezoelectric sensor 100 consists of a capacitor 180. The characterizing feature of this construction resides in the construction between the piezoelectric sensor 100 and the capacitor 22. Namely, in this construction, a series circuit of a resistor 181 and a capacitor 182 is disposed and a reference voltage +3 (V) is impressed via a high resistor 183 (approx. 1 MOhms). Furthermore, the reference voltage and the output of the knock sensor 100 via the capacitor 182 are impressed upon the positive terminal of the operation amplifier 134. The reason why the reference voltage is applied via the high resistor 183 is to bring the knock sensor output into the operating range of the operation amplifier 134. The capacitor 182 takes only the a.c. output from the piezoelectric sensor 100.

The BPF 114 consists of the resistors 15, 16, 17, the capacitors 24, 25 and the operational amplifier 34. The non-inversion terminal of this operation amplifier 34 is connected to the output (3 V reference voltage) of the operation amplifier 33 of the power source 120 having the function of a buffer. Accordingly, the output of the BPF 114 is d.c.-wise biased by the reference voltage. The BPF 114 has the filter function which increases the level difference between the knock signal and the non-knock signals. This facilitates the discrimination by means of the levels. The output of the operation amplifier 34 of the BPF 114 is applied to a resistor 204 of an AGC circuit 160 shown in FIG. 8 that will be described elsewhere.

Next, the operation of the knock sensor fault detection circuit will be described with reference to FIG. 3. The sensor short detector 108 consists of the resistors 9, 10, 11 and the comparator 36. The sensor open detector 109 consists of the resistors 7, 8 and the comparator 37. It will hereby be assumed that the potential at point c of the comparator 36 is set to approximately 0.2 (V) and the potential at the point b of the comparator 37, to approximately 28 (V). If the knock sensor 100 is short-circuited in this instance, the potential at the point a becomes approximately 0 (V). Accordingly, the potential at the point a becomes lower than that at the point c and the output of the comparator 36 becomes approximately 0 (V). In the normal operation of the knock sensor 100 in which it is not short-circuited, the potential at the point a is set to a level higher than that at the point c by the d.c. bias so that the output of the comparator 36 is at the H level (approx. 6 V). On the other hand, when the knock sensor 100 becomes open, the voltage at the point a is about 3.2 (V) and is higher than that at the point b. Hence, the output of the comparator 37 becomes 0 (V). That is to say, when the knock sensor undergoes disconnection of the wire or is short-circuited, the voltage at the point g becomes 0 (V) and the output to the integrator 125 becomes also 0 (V). In this manner, short-circuit and open fault can be detected by the comparators 36, 37.

Figure 6:
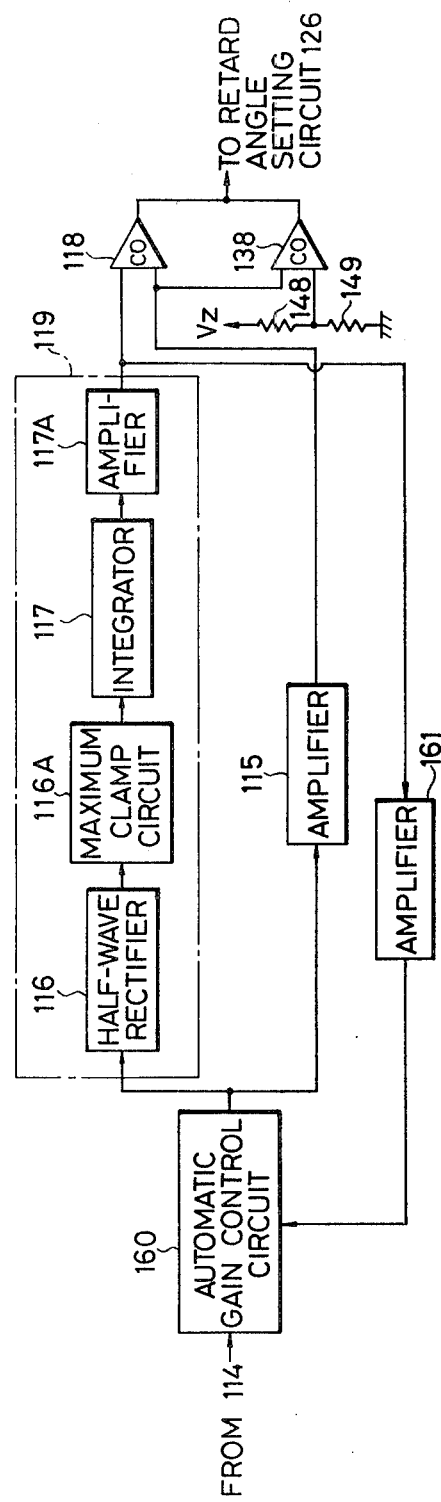
FIG. 6 is a block circuit diagram for accomplishing the automatic gain control of the present invention by the automatic gain control circuit, the background level circuit, the comparator and the amplifier that are shown in FIG. 1.

Referring to FIG. 6, there is shown a block diagram which is suitable for processing the knock sensor output and includes the AGC circuit 160, the BGL circuit 119, the amplifiers 115, 161 and the comparators 118, 138. One of the features of the circuit shown in FIG. 6 resides in the circuit construction between the AGC circuit 160 and the comparator 118. The output of the BPF 114 is applied to the AGC circuit 160. The output of the AGC circuit 160 is divided into two systems. The first system consists of the amplifier 115 which amplifies the knock signal and impresses it to one of the input terminals of the comparator 118. The second system is the BGL circuit 119 consisting of a half-wave rectifier 116, a maximum clamp circuit 116A, an integration circuit 117 and an amplifier 117A. The output of the amplifier 117A is applied to the other input terminal of the comparator 118. The output of the amplifier 117A is negative-fedback to the AGC circuit 160 via the amplifier 161.

The knock sensor output ranges from ±5 (mV) to 600 (mV). In other words, the sensor output varies within the range of 120 times. If this output is merely amplified (100 times, for example), the range becomes ±0.5 (V) to ±60 (V). In a car, however, the maximum is a battery voltage (approx. 12 (V)) and the value 60 (V) does not exist. For this reason, it has been a customary practice either to carry out processing with such a gain that does not saturate or to carry out processing while saturation is sufficiently taken into account as being unavoidable. The former method results in lowering of sensitivity for a weak input while the latter also results in lowering of sensitivity with respect to an input of large amplitude. The construction shown in FIG. 6 is characterized in that the AGC circuit 160 is disposed, and moreover, on the output side of the BPF circuit 114. According to this circuit construction, the level difference between the knock signal and the non-knock signals is increased in the BPF 114 and the signal is impressed upon the AGC circuit 160 with this increased level difference so that the output having a high S/N ratio can be obtained. Further, since the maximum clamp circuit 116A is disposed, abnormal rise of the voltage in the BGL circuit 119 can be prevented.

Another feature of the circuit shown in FIG. 6 resides in disposition of the comparator 138. The inversion input terminal of this comparator 138 is connected to a voltage $V_Z$ (shown in FIG. 12) that is set in advance by voltage division by resistors 148 and 149. The non-inversion input terminal of the comparator 138 is connected to the non-inversion input terminal of the comparator 118. The output of these comparators 118, 138 is applied to the retard angle setting circuit 126. The AGC circuit 160 operates so as to control the BGL output to a constant level, but there is a limit to the amplification ratio that can be set. Accordingly, the BGL output voltage does not sufficiently rise if the knock sensor output signal is small at the low-speed operation of the engine. Hence, there is the possibility that the comparator 118 would detect small signals other than the knock signal as if they were the knock signal. However, if the inversion input terminal of the comparator 138 is set to a voltage $V_{co}$ required for detecting the original knock signal, priority is given to the output of the comparator 138 when the BGL output is lower than the set voltage $V_{co}$ and the knocking pulse is generated in the retard angle setting circuit 126 for the original knock signal, because the comparators 118 and 138 are disposed in the AND arrangement. When the number of revolutions of the engine increases with such a consequence that the level of the BGL voltage becomes higher than the level of the set voltage $V_{co}$ and the knock signal reaches a level at which accurate detection is possible, priority is given to the output of the comparator 118 and the signal is applied to the retard angle setting circuit 126.

According to the experiments, on the other hand, it has bee confirmed that knock signal detection can be made in a satisfactory manner if the knock signal of the comparator 118 is so set as to be higher by approximately 0.5 V than the set voltage $V_{co}$.

Figure 7:
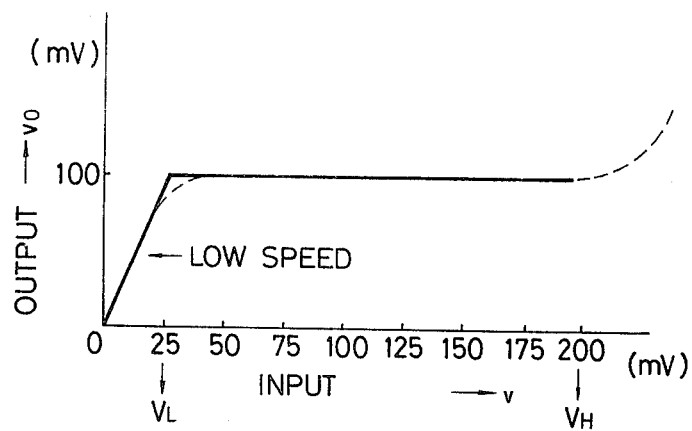
FIG. 7 is a characteristic diagram of the block diagram shown in FIG. 6.

As shown in FIG. 7, the AGC circuit 160 is capable of controlling the output thereof to a constant level except for the low level input ($\pm V_L$) and the high level input ($\pm V_H$).

Referring to FIG. 8, the AGC circuit 160 consists of resistors 204, 205, 207, 209, an operational amplifier 206 and an FET 203. A half wave rectification circuit 116 consists of a capacitor 210, resistors 211, 217, 219, diodes 216, 218 and an operational amplifier 215.

The clamp circuit 116A consists of resistors 225, 230, an operational amplifier 226, a comparator 228, a capacitor 229 and resistors 235, 236. The integrator 117 consists of a resistor 233 and a capacitor 234. The amplifier 117A consists of resistors 237, 238, 239, 241, 242, an operational amplifier 240 and a resistor 243. The amplifier 161 consists of an operational amplifier 248, resistors 250, 251, 252, 249, and a capacitor 253.

Next, the operation of the circuit shown in FIG. 8 will be described. Since the resistance of the resistor 207 is set to high resistance, the amplification ratio of the operational amplifier 206 becomes a value that is determined by the output impedance $Z_F$ of the FET 208 and the resistor 209, that is to say, the gain G is given as follows:

$$G = \frac{v_o}{v_i} \div \left(1 + \frac{R_{209}}{Z_F}\right) \qquad (2)$$

where $v_i$ is the input voltage of the AGC circuit 160 (or the output voltage of the BPF 114) and $v_o$ is the output voltage of the AGC circuit 160.

The important fact in this equation (2) is that the drain-source impedance $Z_F$ of the FET 208 varies depending upon the gate-source voltage $V_{GS}$ of the FET 208. When the $V_{GS}$ drops from 0 (V) to −2 (V), for instance, $Z_F$ becomes great due to the output feedback of the amplifier 161 whereas the gain G becomes small. When $Z_F$ becomes small, the gain G becomes great, on the contrary. As a result, the BGL output voltage produced from the amplifier 117A of the AGC circuit 160 becomes constant irrespective of the fluctuation of the input voltage and its S/N ratio becomes approximately constant. Within the range of $v_i = \pm 200$ (mV), AGC operates sufficiently. Incidentally, the resistor 207 is disposed to protect the FET 208 at the time of its disconnection or defect and is set to high resistance. Further, $Z_F$ has a value of approximately 200 Ohms to approximately 2 K.Ohms.

Further, the resistor 243 and the capacitor 253 have the ripple preventing function for the BGL. In the overall circuit diagram, the operational amplifier (OP) uses HA17902 of Hitachi Ltd. and the comparator (CO) uses HA17901 of Hitachi Ltd. (This also holds true of FIGS. 3 and 12).

Figure 9:
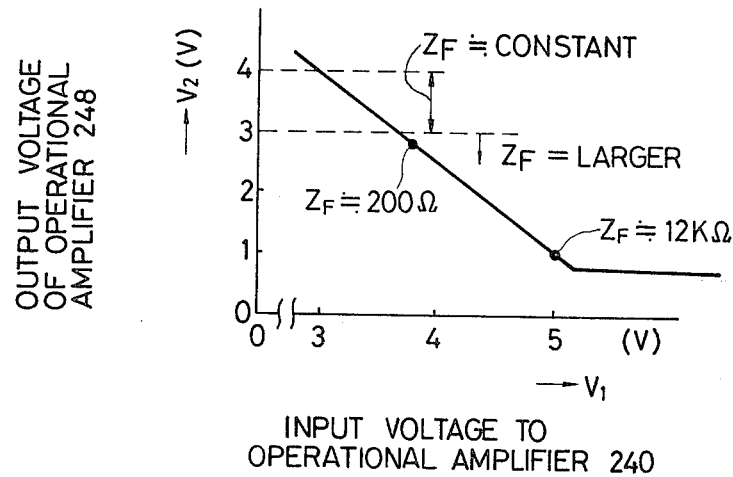
FIG. 9 is a diagram useful for explaining the automatic gain control operation of the circuit shown in FIG. 8.

When no BGL input exists, the + terminal of the operational amplifier 48 is connected to the output terminal (3 V) of the operational amplifier 33 and hence, the terminal input becomes 3 (V). In this case, the resistors 251, 252, 254 of the amplifier 161 exhibit the d.c. compensation function such that the output $V_2$ of the operational amplifier 248 becomes 4 (V), as shown in FIG. 9. Further, the operational amplifier 248 is an inversion amplifier in which when the input $V_1$ increases, the output $V_2$ tends to decrease. Since this output $V_2$ is a gate input of the FET 208 of the AGC circuit 160, when the BGL increases, $V_1$ increases whereas $V_2$ decreases so that the gain G also decreases and the AGC operates. Here, the AGC circuit 160 starts operating from $V_2 = 3$ (V) and $Z_F$ remains constant within the range of 4 (V) to 3 (V).

The operational amplifier 226 of the maximum clamp circuit 116A is a buffer disposed for the impedance conversion. When the non-inversion terminal voltage $V_1$ is about to exceed 5 (V), the comparator 228 becomes conductive and a current is discharged through the diode 227 and the resistor 230 so that the terminal voltage of the non-inversion terminal of the operational amplifier 226 is clamped to maximum 5 (V). For this reason, the inversion output voltage (background voltage level) of the comparator 118 does not vary depending upon the intensity of knocking, and detection of knocking does not become difficult as BGL increases at the time of knocking.

Figure 10:
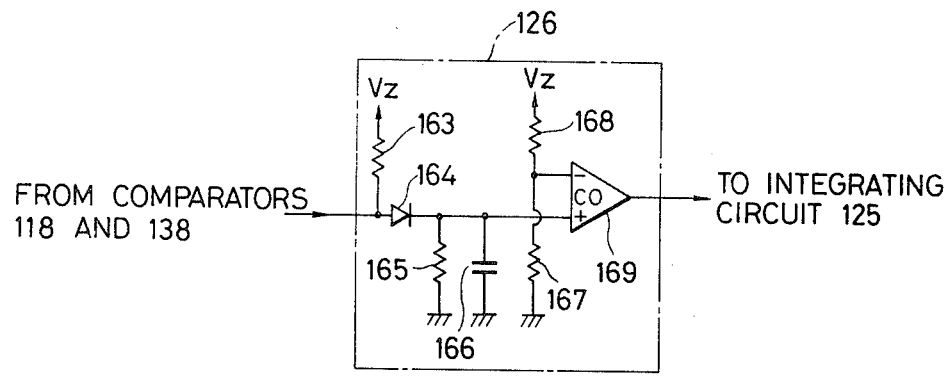
FIG. 10 is a circuit diagram of a retard angle setting circuit shown in FIG. 1.
Figure 11:
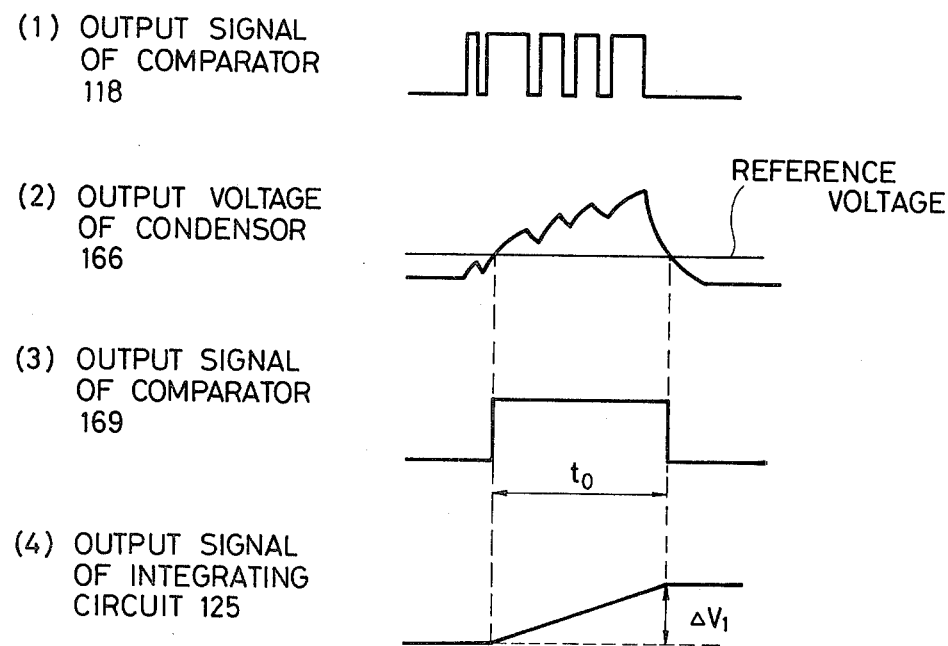
FIG. 11 is a waveform diagram showing the waveform of each circuit portion shown in FIG. 10 in a time chart.

The output of the comparator 118 may be directly applied to the integration circuit 125 or be produced via the retard angle setting circuit 126. FIG. 10 shows the construction of the retard angle setting circuit 126 in this case. FIG. 11 shows the operation waveform. The retard angle setting circuit 126 consists of resistors 163, 165, 167, 168, a diode 164, a capacitor 166 and a comparator 169.

$V_Z$ in FIG. 10 is connected to the $V_Z$ terminal of FIG. 12 to be later described. The comparators 118 and 138 produce pulse waveforms such as shown in FIG. 11(1). As the capacitor 166 repeats charge and discharge, the output of the capacitor (condensor) 166 becomes such as shown in FIG. 11(2). On the other hand, the comparator 169 compares the output of the capacitor 166 with the reference voltage $V_Z$ and obtains a pulse output of a time $t_o$ which is greater than the reference voltage and corresponds to the output of the capacitor 166. This output is applied to the integration circuit 125 and obtains an integration output such as shown in FIG. 11(4).

Figure 12:
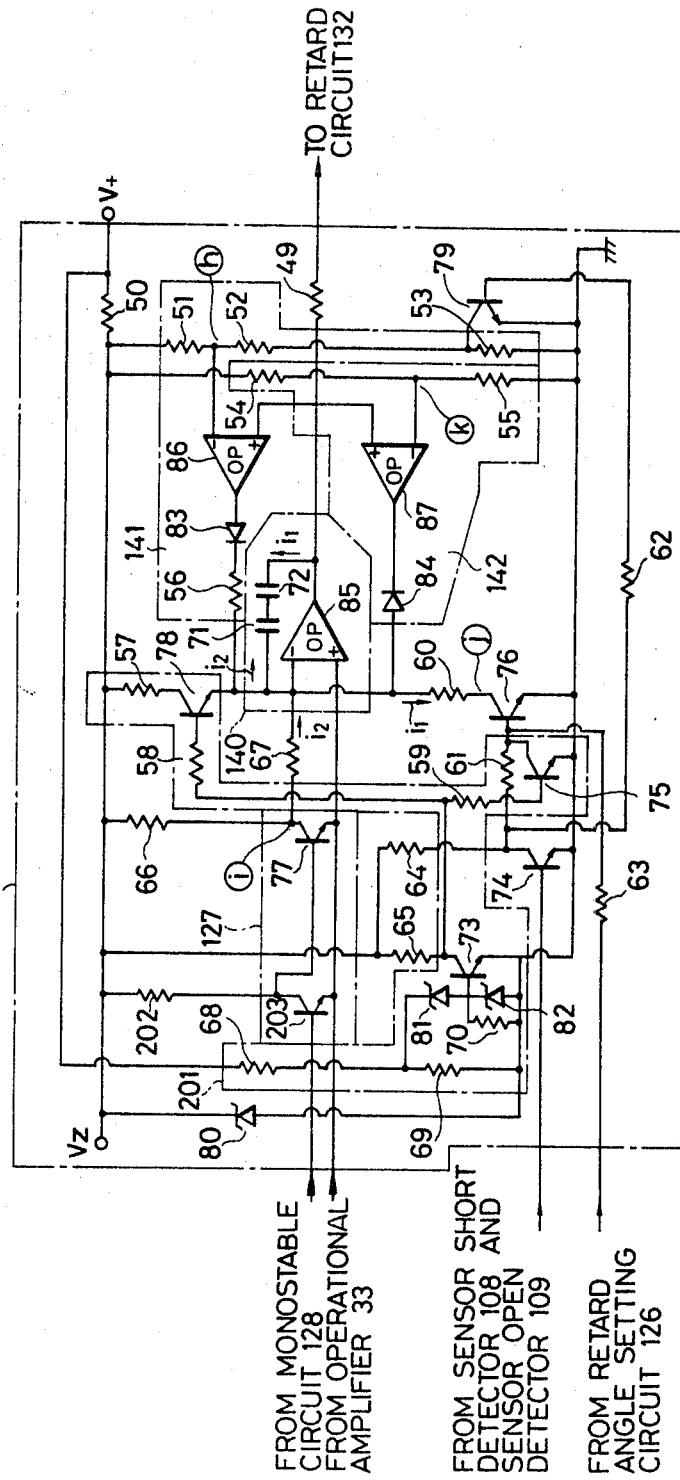
FIG. 12 is a circuit diagram of a circuit including the integrating circuit and the advance angle setting circuit shown in FIG. 1.

Referring to FIG. 12, the integration circuit 125 consists of a mirror integration circuit 140, a maximum clamp circuit 141, a minimum clamp circuit 142, resistors 50, 67, 60, 64, 65, 62, 63, 66, 49, transistors 74, 76, 79, an advance angle setting circuit 127 and a zener diode 80. The mirror integration circuit 140 consists of an operational amplifier 35 and capacitors 71, 72. The maximum clamp circuit 141 consists of resistors 51, 52, 53, 56, a diode 83 and an operation amplifier 86. The minimum clamp circuit 142 consists of resistors 54, 55, a diode 84 and an operational amplifier 87.

An advance angle circuit for engine start 201 consists of resistors 68, 69, 70, 59, 61, 57, 58, transistors 73, 75, 78, a zener diode 81 and a diode 82.

Furthermore, the transistor 77 is subjected to the ON-OFF control by the inversion output of the monostable multivibrator 128 due to the transistor 203 (the inversion output of FIG. 2(2)). These transistors 203 and 77 (Tr 77 is OFF at $t_1$ in FIG. 2(2)) correspond to the advance angle setting circuit 127. The reference potential (3 V) from the buffer 33 shown in FIG. 3 is applied to the emitter of this transistor 77. The transistor 74 is controlled by the short and open detectors 108, 109 shown in FIG. 3. The transistor 76 is controlled by the output signal from the retard angle setting circuit 126 which is actuated by the output of the comparator 118. Further, the output of the mirror integrator 140 is applied to a retard circuit 132 via the resistor 49.

Next, the circuit operation of the integration circuit 125 shown in FIG. 12 will be described.

Now, the transistor 76 is turned ON in synchronism with the knock signal which is the output of the retard angle setting circuit 126. Accordingly, as shown in FIG. 2(7), the transistor 76 becomes conductive during the period of the pulse width $t_o$ of the knock signal (approximately 1 msec to 1.5 msec) and the current $i_1$ flows to the ground from the operational amplifier 85 through the capacitors 72, 71, the resistor 60 and the transistor 76. The output voltage of the operation amplifier 33 at this time is 3 V.

Accordingly, the voltage rise ratio $\Delta V_1$ (voltage rise/pulse) per pulse of the operational amplifier 85 in this instance is given by the following equation:

$$i_1 = \frac{3}{R_{60}} \quad (3)$$

Hence, $$\Delta V_1 = \frac{i_1}{C} t_o \quad (4)$$

where the capacitance C is a series capacitance of the capacitors 71 and 72 and $R_{60}$ is the resistance of the resistor 60.

As is obvious from the equation (4), the output voltage of the operational amplifier 85 increases in proportion to the number or width ($t_o$) of knocking pulses.

On the other hand, the inversion output of the monostable circuit 128 is applied from the transistor 203 to the base of the transistor 77 for every period and the transistor 77 is turned off during the predetermined mask time $t_1$. In this period, the current $i_2$ flows from the power source $V+$ to the operational amplifier 85 through the resistors 66, 67 and the capacitors 71, 72. The zener voltage of the zener diode 80 is 6 V. The negative terminal of the operational amplifier 85 is $-3$ V. Accordingly, whenever one pulse is applied from the monostable circuit 128 to the operational amplifier 85, the output voltage of the operational amplifier 85 drops in accordance with the following voltage drop ratio $\Delta V_2$ (voltage drop value/period):

$$i_2 = \frac{6 - 3}{R_{66} + R_{67}} \quad (5)$$

Hence, $$\Delta V_2 = \frac{i_2}{C} t_1 \quad (6)$$

Where $R_{66}$ and $R_{67}$ represent the values of resistance of the resistors 66 and 67, respectively.

This voltage drop ratio $\Delta V_2$ is set to approximately 1/50, or below, of the voltage rise ratio $\Delta V_1$ in consideration of the power performance of the engine such as the torque and power. The maximum value of the output of the integrator is clamped by the clamp voltage of the maximum clamp circuit 141 and its minimum value, by the clamp voltage of the minimum clamp circuit 142.

At the start of the engine, the integration circuit 125 is furnished with a specific advance angle characteristic (advance angle value) by the advance angle circuit for start 201. This advance angle characteristic is given by the retard circuit 132. As the retard circui 132, it is possible to employ a circuit such as disclosed in U.S. patent application Ser. No. 80,202 by Noboru SUGI-URA, filed Oct. 1, 1979 and assigned to the assignee of this application, "Ignition timing control system for internal combustion engine".

Next, the operation of the retard circuit 132 will be explained.

Figure 13:
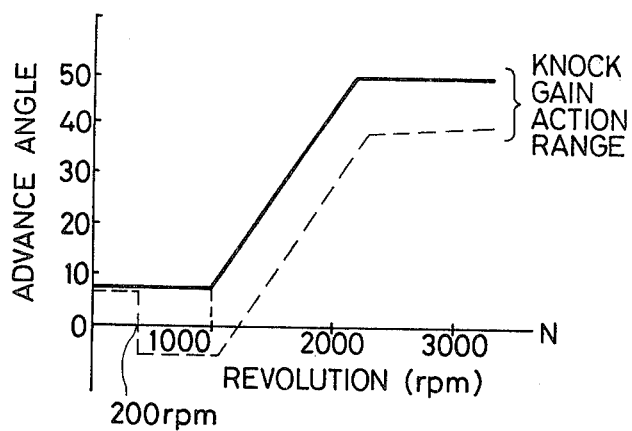
FIG. 13 is a spark timing characteristic diagram of the apparatus in accordance with the present invention.

The spark timing characteristic is generally relative and is determined by a distributor and a certain operation mode which is in turn determined by an ignition device to be employed. Further, the maximum retard angle characteristic at the time of knock is given the spark timing characteristic so that the latter gets on the former at the time of knock. FIG. 13 shows the advance angle and retard angle characteristic, in which the solid line presents the minimum retard angle characteristic in a certain operation mode (that is to say, the minimum clamp voltage) while the dotted line represents the maximum retard angle characteristic at the time of knock (that is to say, the maximum clamp voltage). At the low speed operation of the engine such as below 200 rpm, control is so made as to attain the maximum advance angle characteristic determined by the spark timing characteristic. Such a characteristic is employed in order to reliably ensure smooth start of the engine. Namely, if the spark timing is retarded at the engine start, the engine causes reverse rotational torque and the load of the starter becomes extremely great. As a result, the driving current of the starter becomes abnormally great and the starter can not rotate the engine, the result being so-called start failure. To eliminate such start failure, control is so made as to attain the maximum advance angle characteristic determined by the spark timing characteristic at the engine start such as at a speed of 200 rpm, for example.

Figure 14:
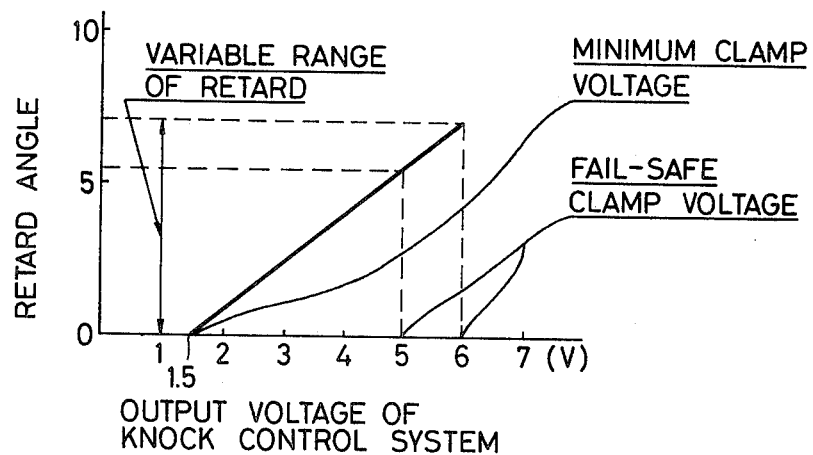
FIG. 14 is a characteristic diagram of the retard circuit used in the apparatus of the present invention.

The characteristic of the retard circuit 132 to accomplish the abovementioned feature is shown in FIG. 14. As shown, the circuit has such a retard characteristic as to exhibit a predetermined angle inclination characteristic with respect to the output of the integration circuit 125, that is, the output voltage of the integrator 140. This attains the advance of a predetermined angle for each period. Namely, the spark timing has such a construction that is retards the angle in response to the number of knocking pulses or pulse width and advances the angle by a predetermined angle in each period.

Next, the operation of the integration circuit 125 for controlling the retard circuit 132, especially the measure taken at the engine start by means of the advance angle circuit for engine start 201, will be described. The zener diode 81 has a zener voltage of about 6 (V). When the power source voltage (V+) is low, that is, at the engine start when the starter is turned on, the intermediate voltage between the resistors 68 and 69 can not turn on the zener diode 81. Hence, the transistor 73 is turned off while the transistors 75 and 78 are turned on. At this time, the transistor 76 is turned off. As the transistor 78 is turned on, a current flows from the power source through the resistor 57 in the same direction as the current i₂ so that the output of the operational amplifier 85 decreases down to a voltage which is equal to the k point voltage and is clamped. This k point voltage corresponds to the minimum clamp voltage (1.5 V) shown in FIG. 14. The output thus clamped sets (to about 200 r.p.m.) the minimum retard angle characteristic at the engine start indicated by solid line in FIG. 13. In this manner, the retard circuit 132 is controlled and is set to the minimum retard angle characteristic.

As shown in FIG. 12, the retard angle control signal from the retard angle setting circuit 126 and the advance angle control signal from the advance angle setting circuit 127 are applied to the mirror integrator 125 of the integration circuit 125, whereby both controls are effected for retard angle and advance angle. As both retard angle and advance angle controls are effected by the single mirror /integrator, the accuracy of knocking control can be improved.

Next, the operation of the integration circuit 125 at the time of failure of the sensor 100 will be described.

The transistor 74 is turned off by the output from the sensor short detector 108 and that from the sensor open detector 109 shown in FIG. 3, respectively, while the transistors 76 and 79 are turned on. When the transistor 76 is turned on, the current i₁ keeps flowing through the capacitors 71, 72 in the same way as in the abovementioned angle retard operation and consequently, the output voltage of the operational amplifier 85 is clamped at the 6 V voltage (maximum voltage) that is the same as the h point voltage. Further, since the transistor 79 is turned on, the h point voltage is controlled to a 5 V fail-safe voltage that is lower than the normal voltage as shown in FIG. 10. Thus, a suitable angle retard characteristic can be obtained even in an abnormal case.

Incidentally, if the transistor 79 is omitted, the fail-safe clamp voltage becomes 6 V as shown in FIG. 14. Whether the fail-safe voltage is to be set to 5 V or 6 V is determined by the engine performance.

FIG. 15 shows an operation waveform diagram when the abnormal voltage overlaps the point a of FIG. 13. This abnormal detection is effected as the detectors 108 and 109 function also as the abnormal detectors. FIG. 15(1) shows the base signal of the power transistor. If for any reason the knock sensor 100 produces the abnormal signal, voltages higher than the b point voltage are continuously produced as shown in FIG. 15(2) so that the output of the comparator continuously drops to 0 (V) as shown in FIG. 15(3). Consequently, the output of the integration circuit 125 first operates such as shown in FIG. 15(4) and is then clamped to the fail-safe clamp voltage (5.4 V in the drawing). Hence, the sufficient measure is provided against the abnormal voltage.

What is claimed is:

1. An engine knock control apparatus comprising:
   a knock sensor for detecting an engine knock signal;
   an automatic gain control circuit coupled to receive and amplify a knock detection signal from said knock sensor;
   an integrating circuit coupled to receive an output signal from said automatic gain control circuit to provide an integrated output signal;
   means for coupling said integrated output signal to a control input of said automatic gain control circuit to control the amplification of said knock detection signal in accordance with the level of said integrated output signal; and
   a comparator coupled to receive and compare said integrated output signal and the output signal from said automatic gain control circuit to provide a spark timing control signal to an ignition control device based on said comparison of said integrated output signal and the output signal from said automatic gain control circuit.

2. An apparatus according to claim 1, wherein said coupling means comprises a second integrating circuit coupled to integrate said integrated output signal prior to application to said automatic gain control circuit control input.

3. In an engine control apparatus including a knock sensor for detecting an engine knock signal;
   a first integrating circuit for integrating the output of said knock sensor;
   a comparator for producing an output for controlling an ignition control device which controls the spark timing of an ignition coil by means of a signal obtained by the output thereof when the output of said knock sensor becomes greater than the output of said integrating circuit;
   the improvement including a knock signal clamping circuit which is disposed between the input of said integrator and the output of said knock sensor and clamps the output signal of said sensor in a setting wave height when the wave height of said signal becomes above said setting wave height for preventing abnormal rise of a voltage of said integrating circuit, whereby said comparator compares the output signal from said integrating circuit and that from said sensor.

4. The engine knock control apparatus as defined in claim 1 or 3, wherein said second integration circuit for controlling said ignition control device is disposed between said comparator and said ignition control device to control the spark timing of said ignition coil by means of a signal obtained by integrating the output of said comparing means, and a retard angle setting circuit is disposed between said comparing means and said second integration circuit in order to take in the output signal of said comparing means and to variably control the retard angle of the spark timing of said ignition coil in response to the knock signal.

5. The engine knock control apparatus as defined in claim 1 or 3, wherein a second integration circuit for controlling said ignition control device is disposed between said comparator and said ignition control device for controlling the spark timing of said ignition coil by means of a signal obtained by integrating the output of said comparing means, and an advance angle setting circuit is disposed between said ignition coil device and said second integration circuit in order to take in the output signal of said ignition control device and to effect advance angle control of the spark timing of said ignition coil.

6. The engine knock control apparatus as defined in claim 1 or 3, wherein a gate circuit for cutting the output from said knock sensor to said first integrating circuit in response to the output of said ignition control device is disposed between said knock sensor and said first integrating circuit in order to prevent the erroneous operation of said engine knock control apparatus in response to the ignition noise generating at the time of ignition of said ignition coil.

7. The engine knock control apparatus as defined in claim 1 or 3, wherein an advance angle circuit for engine start is disposed between said comparator and said ignition control device in order to detect the engine start and to clamp the ignition timing at a predetermined value.

8. In an engine knock control apparatus including: a knock sensor for detecting an engine knock signal; an averaging circuit for averaging the output of said knock sensor; comparing means for producing an output when the output of said knock sensor becomes greater than the output of said averaging circuit; and an integration circuit for controlling an ignition control device for controlling the spark timing of an ignition coil by means of a signal obtained by integrating the output of said comparing means; the improvement including a fail-safe device for effecting biasing by means of a constant current circuit and for detecting disconnection and short-circuit of said knock sensor, disposed between said knock sensor and said comparing means, said fail-safe device retarding the angle of the spark timing of said ignition coil to a predetermined value by the output thereof.

9. In an engine knock control apparatus including:
   a knock sensor for detecting an engine knock signal;
   a first integrating circuit for integrating the output of said knock sensor;
   comparing means for producing an output for controlling an ignition control device which controls the spark timing of an ignition coil by means of a signal obtained by the output thereof when the output of said knock sensor becomes greater than the output of said integrating circuit;
   the improvement including a fail-safe device which is disposed between said knock sensor and said ignition control device, and has upper and lower limit setting voltages for detecting normal and abnormal conditions of said knock sensor, said fail-safe device detecting a normal condition when a detecting voltage of said knock sensor is within the range of said setting voltages, detecting an abnormal condition and retarding the angle of the spark timing of said ignition coil to a predetermined value by the output thereof when a detected voltage is out of the range of said setting voltages.

10. The improvement according to claim 9, wherein said fail-safe device includes a constant current source for providing a prescribed bias to the output of said knock sensor.

* * * * *